Figure 1:
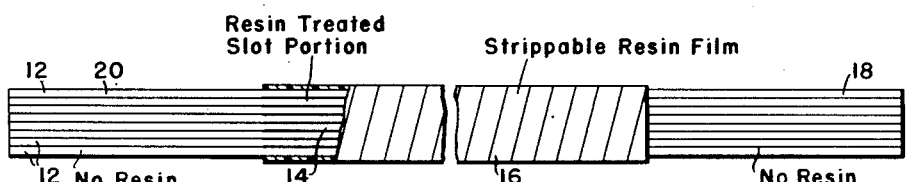

Sept. 10, 1957　　　J. C. BOTTS ET AL　　　2,805,472
METHOD FOR PRODUCING INSULATED COILS AND PRODUCTS THEREOF
Filed June 26, 1953

WITNESSES:
John E. Heasley
Leon M. Garman

INVENTORS
John C. Botts &
Jack E. Northwood
BY
Frederick Shapoe
ATTORNEY

United States Patent Office 2,805,472
Patented Sept. 10, 1957

2,805,472

METHOD FOR PRODUCING INSULATED COILS AND PRODUCTS THEREOF

John C. Botts, Pittsburgh, Pa., and Jack E. Northwood, Dunkirk, Ind., assignors to Westinghouse Electric Corporation, East Pittsburgh, Pa., a corporation of Pennsylvania Application June 26, 1953, Serial No. 364,352

2 Claims. (Cl. 29—155.61)

This invention relates to a novel method for preparing homogeneously insulated multiconductor coils and particularly for producing half coils.

Heretofore, in preparing multiconductor coils, such, for example, as half coils for high-voltage generators, it was the practice to prepare a bundle or winding comprising the desired number of conductors, the bundle being relatively straight, and of a length of from, for example 8 to 40 feet. Thereafter, the central portion of this bundle of conductors, which was to form the slot portion, was coated with a phenolic bonding resin and wrapped with at least one layer of cotton tape and a layer of glassine paper. The bundle was then placed in a hot press and the slot portion was molded to shape while heated to drive off the solvents from the phenolic varnish and then to cure the phenolic resin to a thermoset state to hold the slot portion in its molded shape. The cotton tape was saturated with the phenolic resin and formed an integral part of the slot portion. The glassine paper functions as a separator to prevent sticking of the phenolic varnish treated tape to the press walls. However, the glassine paper stuck to the cotton tape and it prevented good adhesion to the coil of subsequently applied ground insulation. The ends of the bundle of conductors were shaped into the desired form of the end portions or diamonds, either before or after this molding operation. The resulting coil was then provided with ground insulation which comprised mica tape and was impregnated with a suitable varnish.

By this prior art practice, the final completely insulated coil was not fully homogeneous. As mentioned previously, the glassine paper prevented good bonding of the ground insulation with its impregnating resins to the phenolic bonding resin in the coil. Furthermore, the phenolic resin impregnated cotton tape does not contribute much to the insulation on the coil inasmuch as the cotton tape is an organic material that deteriorates rapidly and its electrical insulating characteristics are considerably inferior to an equal thickness of mica tape, for example.

The object of this invention is to provide for a novel process for preparing multiconductor coils wherein a winding of the conductors is mounted to shape and size before application of ground insulation and is free from any cotton tape, separators or other low quality insulation.

A further object of the invention is to provide for preparing a multiconductor coil with completely reactive resinous compositions in combination with a readily strippable resinous film which can be removed thereby producing a coil that can be readily provided with ground wall insulation and similar resinous impregnants to produce homogeneous insulation whereby superior electrical characteristics are obtained.

Figure 2:
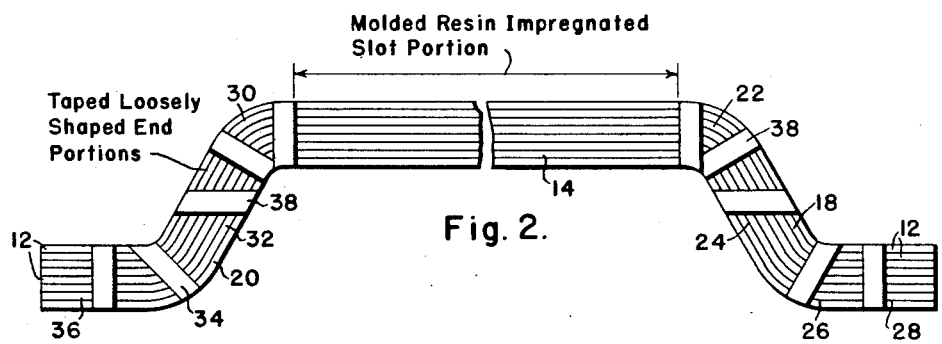

Other objects of the invention will in part be obvious and will in part appear hereinafter. For a better understanding of the nature and objects of the invention, reference should be had to the following detailed description and drawing, in which:

Figure 1 is a view in elevation, partly broken away, of a winding in the first step of the process; and Fig. 2 is a view in elevation, partly broken away, of a complete winding prior to application of ground insulation.

In accordance with the present invention, we produce multiconductor coils with homogeneous insulation that are electrically superior to coils produced by prior art practices. Referring to Fig. 1 of the drawing, there is illustrated a winding 10 which is prepared by superimposing a plurality of conductors 12, each of the conductors being lightly insulated. Such insulation may comprise a thin layer of glass or asbestos fibers coated with a varnish. The individual conductors 12 may comprise rectangular or square copper or aluminum strap, or be of other shape. For high voltage generators, the conductors may be prepared into the winding 10 with a Roebel transposition. The total length of each of the conductors 12 may be up to 40 feet and even more. The center portion 14 of the winding 10 is to form the slot portion which will fit within the magnetic core of an electrical machine. For maximum efficiency, it is desirable that the slot portion 14 be highly compacted and of predetermined shape and size in order to fit closely to the walls of the slot. The ends 18 and 20 beyond the slot portion 14 of the winding 10 are to be bent and shaped into the end portions or diamond portions which are to be connected to the end portions of other coils after assembly in a machine. There is not as stringent a requirement for a high degree of compacting of the ends 18 and 20 as there is for the slot portion 14. In practicing the present invention, the slot portion 14 of the winding is treated by brushing it or otherwise applying to it a liquid, completely reactive, thermosettable resinous composition as will be disclosed in detail hereinafter. The quantity of the completely reactive composition applied should be sufficient to fill all of the spaces and interstices in the final compacted slot portion with a slight excess to cover all of the exterior surfaces of the conductors at the slot portion 14.

The liquid resin coated slot portion 14 is then wrapped with a layer 16 of a strippable solid resin film non-reactive with the liquid resin. Suitable strippable resin film materials for the practice of this invention are a tape one or two inches wide and of a few mils thickness of a polyethylene glycol-terephthalate resin, polytetrafluoroethylene, or polyvinyl alcohol. The layer 16 may comprise such tape applied half-lapped. The purpose of the layer 16 is to prevent loss of the applied completely reactive resin by exudation or dripping and in subsequent molding operations.

The winding 10 is then placed in a hot press which has a suitable die for molding the portion 14 to the desired shape and form for the final slot portion. In this press, the applied liquid resin is cured to a thermoset solid while the portion 14 is under pressure. Under pressure, the applied resin will be forced into all of the interstices and openings present in the slot portion 14 and a slight amount of the resin will exude to and coat the surface of portion 14, but will be prevented from escaping by the layer 16. The portion 14 will be solidly filled with the resin applied thereto.

Inasmuch as some of the liquid resinous composition at each end of the slot portion 14 will tend to travel a slight distance into the ends 18 and 20 while under pressure, it is ordinarily desirable to apply the liquid resinous composition and layer 16 a slight distance beyond the normal slot portion of the coil that actually fits within the magnetic core. In this way, that length of the slot portion that actually fits within the magneic core is completely impregnated with the completely reactive resin. After the applied completely reactive resin has been fully cured, the winding 10 is removed from the hot press and the resin film forming the layer 16 is readily stripped. We have found that a light cut with a knife will enable the layer 16 to be stripped in a minute or two. The resulting winding 10 will have substantially the minimum cross sectional area at the slot portion 14 since there will be no surface tapes or wrappings thereon and only a small thickness of resin will be evident at the surface. The resin bonded central portion 14 will hold the entire winding together. The ends 18 and 20 will be loose and flexible since they have not been bonded. It is desirable that these ends be relatively free and flexible in order to enable succeeding operations to be carried out.

Thereafter, the winding 10 with the bonded slot portion 14 is shaped in a jig, for example, in order to produce the desired end portion configuration. As shown in Fig. 2 of the drawing, the unbonded end portion 18 is bent to provide an arc 22 joining the portion 14, a tangent 24, another arc 26 and finally a straight portion 28. The other end 20 is similarly shaped to provide an arc portion 30, tangent 32, a second arc portion 34, and a straight portion 36. In order to retain the unbonded end portions 18 and 20 of the conductors in substantially the shape required, separated turns of a tape 38 are applied as illustrated. Inasmuch as the insulation must be maintained at its maximum dielectric strength for a given thickness at the slot portion owing to its proximity to the magnetic core in an electrical machine, there is no taping present on the slot portion 14. However, the end portions do not need to meet as stringent insulating requirements. Therefore, the tape 38 may be applied thereto and left thereon during the subsequent application of ground insulation. The shaped winding shown in Fig. 2 has only the normal turn or interconductor insulation present thereon and no ground insulation at this stage of its construction.

Thereafter, the winding, such as shown in Fig. 2, is provided with ground insulation. For most electrical machines, the ground insulation comprises layers of mica tape which are wrapped over the entire length of the coil. The number of layers of mica tape is dependent on the voltage to which the coil will be subjected. As many as 16 layers of mica tape of 7 to 10 mils thickness may be applied half-lapped. Thereafter, the mica taped coil is impregnated with a liquid, completely reactive, thermosettable resin, preferably a resin that is similar to that previously applied to the slot portion 14, or of a nature such that will bond thereto. The application of the mica tape and resin and the procedure employed in curing it may be similar to that disclosed in copending patent application Serial No. 294,896, assigned to the assignee of the present invention. The liquid completely reactive resin applied to the ground insulation also penetrates to and fills the taped loosely shaped end portions 18 and 20. After the completely reactive resin applied to the ground insulation has been cured under heat and pressure, the entire coil will have its conductors 12 bonded together by the completely reactive resin. Furthermore, the ground insulation will be completely saturated with the completely cured resin. The resin in the ground insulation will be bonded firmly and directly to the slot portion 14 and the resin previously applied thereto without any cotton tape, glassine separator or other undesirable separating medium being present which would restrict bonding and result in lower life or inferior dielectric strength. Consequently, a homogeneous insulation is present throughout the coil.

Completely-reactive compositions suitable for use in the process may include any fluid polymerizable composition that, upon being heated to a predetermined temperature, polymerizes into a relatively-hard resinous body. The fluid resinous composition may comprise a single polymerizable component such, for example, as diallyl phthalate, diallyl succinate, diallyl maleate, diallyl adipate, allyl alcohol, methallyl acrylate, diallyl ether, allyl acrylate, allyl crotonate or a partially condensed organosiloxane having a ratio of R to Si of from 1:1 to 1:1.8. It will be noted that many suitable compositions comprise at least one unsaturated group $>C=C<$ capable of vinyl-type additive polymerization. The best results have been secured with monomers containing two or more of these unsaturated groups capable of polymerization upon being subjected to heat. It will be understood that mixtures of any two or more of the polymerizable monomers may be employed. Numerous other multicomponent completely-reactive compositions are known to the art. Such compositions include, in many cases, an unsaturated resinous component—particularly an unsaturated alkyd resin—and an unsaturated polymerizable liquid monomer. Particularly good results have been secured by employing as the resinous alkyd resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a polyhydric alcohol such as glycol, glycerol, or pentaerythritol or mixtures thereof. Castor oil has been employed, successfully in reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, the unsaturated alpha-beta dicarboxylic acid or anhydride may be replaced with up to 90% of the weight thereof of a saturated aliphatic dicarboxylic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols—particularly with dicarboxylic acids instead of their anhydrides.

The alkyd esters may be dissolved in a liquid unsaturated monomer having the group $>C=C<$. Suitable liquid unsaturated polymerizable monomers are: monostyrene, alpha methyl styrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene and divinyl benzene, or mixtures of two or more of any of these monomers.

The unsaturated reactable composition preferably contains a polymerization catalyst. Suitable polymerization catalysts for olefinic compositions include peroxides, ozonides, perhalides, and peracids. Examples of suitable catalysts are benzoyl peroxide, tert-butyl perbenzoate, tert-butyl hydro-peroxide, di-t-butyl peroxide, di-t-butyl diperphthalate, 1-hydroxy cyclohexyl hydroperoxide-1 and ascaridol. 0.1% or less of the polymerization catalyst, based on the weight of the composition, may be employed, but more rapid reaction is obtained if the amount of the catalyst is higher—preferably from ½% to 5% by weight. The polymerization catalyst when admixed in the completely-reactive composition, may cause it to increase in viscosity slowly at ordinary temperatures; and, therefore, it may be desirable to maintain the catalyzed composition to a temperature of 10° C., or lower, thereby increasing the tank life of the composition, as well as including an inhibitor such as hydroquinone.

Other completely reactive resins may comprise complex epoxides. Such epoxides may be prepared by reacting one mole of a dihydric phenol such as bis(p-hydroxyphenyl)-dimethylmethane with from one to two moles of an epihalohydrin or dihalohydrin. Glycidol ethers and their reaction products with phenols as set forth in Patent 2,506,486 are suitable epoxides. These epoxides may be admixed with boron trifluoridepiperidine reaction product or amines, as catalysts, or dicarboxylic acid anhydrides, and upon heating the mixtures will thermoset. Reference should be had to U. S. Patents 2,582,985; 2,512,997; 2,506,486 and 2,324,483 for examples of the preparation and use of such epoxides.

We have produced numerous coils in which the slot portion was coated with a liquid completely reactive solution comprising 85% by weight of monostyrene and 15% by weight of a polyester prepared by reacting 44 mole percent of adipic acid, 6 mole percent of fumaric acid and 50 mole percent of propylene glycol reacted to a viscosity of approximately 1,000 poises. This resin contained 0.5% by weight of benzoyl peroxide as a catalyst. The slot portion was half lapped with a tape comprising 1½ inch wide film of one mil thickness of polyethylene glycol-terephthalate. The coils were pressed for one hour at a temperature of 150° C. which was sufficient to cure the resin to a solid thermoset state. The coils were then removed from the press and the tape was stripped therefrom. Thereafter, the ends of the coils were shaped to produce the desired end portion configuration and taped with a one inch wide cotton tape applied at spaced intervals. Thereafter, the coils were wrapped with a plurality of layers of mica tape in the manner set forth in Example 12 in copending application, Serial No. 294,896 previously mentioned. The complete coils were tested and in all cases the ground insulation was found to be firmly bonded to the coil without any weakness which would have been occasioned if glassine paper and tape had been employed in accordance with previous practice. Sections of the slot portion of the coils were cut out and tested to determine the bond between the conductor and the ground insulation. These tests indicated excellent adhesion that would withstand pressures short of destruction of the ground wall insulation. The homogeneity of the total insulation was excellent.

Coils produced in accordance with the present invention are actually thinner at the slot section than coils produced with a cotton tape wrapping. Other advantages will be apparent to those skilled in the art.

Since certain changes may be made in the above invention and different embodiments of the invention may be made without departing from the scope thereof, it is intended that all matter contained in the above described disclosure shall be interpreted as illustrative and not in a limiting sense.

We claim as our invention:

1. In the process of preparing a multiconductor coil having a slot portion and end portions extending from each end of the slot portion, the steps comprising assembling a plurality of lightly insulated conductors into a relatively straight, loose winding, applying a liquid, completely reactive, thermosettable resin to the central portion of the winding of a length to form the desired slot portion, the resin coating and impregnating all of the conductors at said central portion, wrapping the resin coated central portion with a layer of an impervious solid film of a resin non-adherent to the applied resin, the wrapping serving to retain the liquid resin in the central portion, molding the wrapped and resin coated central portion under heat and pressure in order to compact the central portion into desired shape and size, and to convert the applied resin to a thermoset solid resinous binder to unite the conductors at the central portion and to retain the compacted size and shape, the conductors at the ends of the winding being relatively loose and unbonded, stripping the wrapping of resinous film, shaping the ends of the winding into substantially the shape of the desired end portions and tieing the shaped end portions to hold the conductors together, thereafter wrapping layers of a sheet ground insulating material about the coil from end to end, impregnating the wrapped coil with a liquid, completely reactive, thermosettable resinous composition, and curing the applied liquid resinous composition to a solid resin, the cured liquid resinous composition bonding to the ground insulating material and to the impregnated slot portion.

2. The process of claim 1, wherein the ground insulating material comprises layers of mica sheet insulating material and the liquid, completely reactive, thermosettable resinous composition applied to the wrapped coil is similar to the resin used to bond the conductors in the slot portion.

References Cited in the file of this patent

UNITED STATES PATENTS

| | | |
|---|---|---|
| 1,586,889 | Elmen | June 1, 1926 |
| 2,623,920 | Ford | Dec. 30, 1952 |
| 2,654,142 | Horelick | Oct. 6, 1953 |